Patented Feb. 2, 1937

2,069,204

UNITED STATES PATENT OFFICE 2,069,204

PRODUCTION OF RUSTLESS IRON

William B. Arness, Baltimore, Md., assignor, by mesne assignments, to Rustless Iron and Steel Corporation, Baltimore, Md., a corporation of Delaware No Drawing. Application July 20, 1933, Serial No. 681,374

9 Claims. (Cl. 75—127)

This invention relates to rustless irons and steels and more particularly to an art of producing the same.

Among the objects of my invention is the simple, direct and economical production of rustless irons and steels of an inherently fine grain structure and improved physical characteristics such as strength, hardness, formability (especially deep-drawing), weldability, corrosion-resistance, heat resistance and the like, made to a desired specification of carbon, chromium and nitrogen, either with or without supplementary additions of nickel, copper, cobalt, titanium, molybdenum, tungsten, vanadium and the like.

The invention, accordingly, consists in the features of construction, combination of elements and arrangement of parts, and in the several steps and the relation of each of the same to one or more of the others as described herein and the scope of the application of which is indicated in the following claims.

As conducive to a clearer understanding of certain features of my invention it may be noted at this point that, as more particularly pointed out in my co-pending application, Serial No. 645,637, entitled Non-corrosive alloy, filed December 3, 1932, many highly beneficial characteristics are given rustless iron and steel by adding to the metal a small percentage of nitrogen. The irons and steels containing nitrogen are of an inherently fine, even-grain structure; they are of improved workability over a wider range of working temperatures; they are less subject to grain growth, decarburization, brittleness and fatigue, and they are more durable and of higher impact values than heretofore known alloys of the class indicated.

One of the outstanding objects of my invention is the efficient, economical and thoroughly practical production of rustless irons and steels to a required analysis of carbon and chromium, either with or without supplementary additions indicated above, wherein a desired nitrogen content is reliably and economically achieved.

In the practice of my invention, a suitable furnace, for example, an electric arc furnace is charged with desired raw materials, such as rustless iron scrap and/or ordinary low carbon steel scrap and an oxidizing agent such as iron ore, roll scale or the like. This charge is melted down forming a bath of ferrous metal covered by an oxidizing slag, and then brought to a uniformly high temperature. Chromium additions are made either along with the initial melt-down ingredients, using, for example, high carbon ferrochrome or chrome ore, or these additions may be made to the bath and slag formed as indicated above, using chrome ore.

Certain practical advantages, such as savings in power consumption, improved furnace operating conditions, and the like, are gained by making the chromium additions both along with the initial charge of ingredients and to the bath of metal and slag after melt-down.

Under the action of the strongly oxidizing slag and the high temperatures employed, carbon coming from the furnace electrodes and furnace atmosphere, as well as from the raw materials, is effectively excluded and/or removed from the bath of ferrous metal. Along with the oxidation of carbon there is an incidental oxidation of chromium from the metal, the chromium oxides formed being transferred into the slag. After complete melt-down of the ingredients to form a ferrous metal bath of low carbon content covered by a slag containing the oxides of iron and chromium is achieved, as indicated above, a suitable reducing agent, such as ferrosilicon, is charged into the furnace to recover iron and chromium from the slag overlying the bath of metal to enable the production of rustless iron in an efficient and economical manner. Along with the reducing agent there is added a desired quantity of basic slag forming materials, such as burnt lime.

Under the action of the reducing agent employed the oxides of iron and chromium contained in the slag are reduced and the iron and chromium resulting from this reduction step gravitate from the slag into the underlying bath of metal, thereby enriching the same.

To achieve a finished metal of a desired percentage of nitrogen, a nitrogen containing alloy, preferably a ferro-alloy, such as the relatively inexpensive nitrogen containing high-carbon ferrochrome, is added along with the initial charge of ingredients. The carbon contained in the nitrogen containing high-carbon ferrochrome is oxidized along with the carbon coming from the other ingredients employed. The chromium lost into the slag through the incidental oxidation of chromium contained in the ferrochrome is recovered along with the other chromium oxides contained in the slag during the reducing stage of the process as indicated above. After substantially all of the iron and chromium contained in the slag are recovered this slag is withdrawn and a desired refining and finishing slag is prepared in accordance with standard practice. The finished metal is tapped into suitable molds and allowed to cool.

The metal is of an inherently fine even-grain structure and may be worked over a wider range of temperatures than heretofore known rustless irons and steels; the metal is less subject to grain growth, brittleness, decarburization and fatigue, and is more durable and of higher impact values than alloy irons of the class indicated, all as more particularly pointed out in my copending application referred to above.

Referring now more particularly to the practice of my invention a 6-ton Heroult furnace rated three-phase, 25 cycle, 1500 KVA at 110-180 volts is conveniently employed. The furnace is preferably provided with a chromite brick bottom which is carried up to a height somewhat above the slag line. For reasons of economy in construction and operation, an inner lining made of three parts crushed chrome ore and one part ground magnesite with a sodium silicate binder is preferably rammed in over the chromite brick hearth lining. The furnace side walls and the roof are conveniently lined with silica brick in accordance with standard practice. The furnace is provided with three electrodes projecting through the roof and into the furnace chamber bounded by the bottom, side walls, and roof. Either carbon or graphite electrodes are employed as desired.

Electrical energy is supplied the furnace from a bank of transformers, the potential output of which may be controlled over a fairly wide range, connected to a suitable source of power.

In order to prepare the furnace for the reception of a charge of raw materials, the furnace is heated up by arcing on electrode butts in accordance with standard practice. After a sufficient heating is accomplished the furnace is charged with a desired quantity of iron and chromium ingredients, including an alloy of high nitrogen content, together with oxidizing slag forming agents which are rapidly melted down to form a bath of ferrous metal containing chromium and nitrogen covered by a slag containing oxides of iron and chromium. The metallic oxides contained in the slag are reduced in a subsequent stage of operation to augment the bath in iron and chromium and effect a dilution of nitrogen to some extent.

Although there is experienced some loss in nitrogen during the oxidation of carbon and chromium from the bath of metal (the chromium oxidized from the bath of metal apparently carrying with it a certain amount of nitrogen which may not be recovered during the subsequent reduction stage) the major portion of the nitrogen is retained in the bath.

In the practice of my invention, where, for example, a rustless iron containing 16% to 18% chromium about .08% to .12% nitrogen and not more than .10% carbon is desired, there is charged onto the bottom of a 6-ton Heroult furnace, which is first prepared for the reception of the charge as more particularly indicated above, illustratively, 3500 pounds of low carbon steel scrap, 10,800 pounds of rustless iron scrap (analyzing approximately 17% chromium, .10% carbon and with ordinary precentages of manganese, silicon, phosphorus and sulphur) together with 2000 pounds of chrome ore (analyzing about 48% chromium sesquioxide, 16% iron oxide and the balance mainly oxides of aluminum and silicon), and 3,000 pounds of roll scale.

To achieve a desired nitrogen content in the finished metal there is preferably added along with the initial charge of ingredients 1,350 pounds of nitrogen containing high carbon ferrochrome analyzing 68% chromium, about 5% carbon, about 2% nitrogen and the balance principally iron, prepared for example as more particularly described in the copending application of James N. Ostrofsky, Serial No. 681,371 entitled Ferro-alloy and art of producing the same, filed July 20, 1933.

Electrical energy is supplied the furnace as indicated above and the charge of ingredients is rapidly melted down to first form separate pools of metal covered by supernatant slags beneath the several electrodes. These pools of metal and overlying slags rapidly grow and run together to form a bath of ferrous metal containing chromium and nitrogen covered by an oxidizing slag.

With the continued application of power the bath of metal and the supernatant slag are brought to a uniformly high temperature.

While no reliable method is known for precisely determining the temperature of the pools of metal and later the bath of metal beneath the overlying slag blanket, it is estimated that this temperature is approximately 3,000° F. to 3,200° F., which is some 100° F. to 300° F. higher than that ordinarily employed in steel melting practice. At this temperature, conveniently referred to as a temperature of super-heat, the oxidizing slag is more active in combining with carbon coming from the furnace atmosphere, especially from the furnace arcs, and from the carbon introduced with the initial charge of ingredients, particularly the high-carbon ferrochrome and the ferrochrome nitride, to exclude and remove carbon from the molten metal.

Incidental to the oxidation of carbon, there is an oxidation of chromium from the metal, the chromium oxide thus formed entering the slag. While the extent of the loss of chromium into the slag is somewhat minimized by rapidly melting down the charge of ingredients and bringing the bath of metal and slag to a uniform temperature of super-heat, as indicated above, a considerable quantity of chromium is oxidized and enters the slag.

In order to effect a recovery of the metals contained in the slag, there is added illustratively 1700 pounds of crushed 75% ferrosilicon together with 5100 pounds of freshly burned lime which are added as rapidly as furnace conditions permit. The additions of lime and ferrosilicon readily fuse and become incorporated in the slag and effect a reduction of the oxides of iron and chromium contained therein; the large quantity of lime, reacting with the various silicates (acid in character), formed as a result of the reducing action of the ferrosilicon, to give a basic or neutral slag.

As the reducing action of the ferrosilicon progresses, the character of the slag changes in color from a black to a light green, in accordance with the reduction of the oxides contained in the slag and the transfer of metal from the slag to the underlying bath of molten iron and chromium. When the light green color indicates that substantially all of the oxide content has been reduced, the slag is preferably completely removed from the surface of the metal bath and a basic finishing slag of lime, ferrosilicon and fluorspar is formed in accordance with standard practice.

Final additions of ferrosilicon and ferromanganese are added to adjust the analysis of the bath to desired specifications of silicon and manganese.

The heat of metal is then tapped into suitable molds and permitted to cool. The tapped metal weighs about 18,000 pounds and analyzes 17.2% chromium, .08% carbon, .08% nitrogen and with the usual percentages of manganese, silicon, phosphorus and sulphur and the balance principally iron.

Supplementary additions of nickel, copper, cobalt, titanium, tungsten, vanadium and the like are made as desired any time before tapping in accordance with standard practice.

Thus it will be seen that there has been provided in this invention an art in which the various objects hereinbefore noted together with many thoroughly practical advantages are successfully achieved. It will be seen that the process is simple, practical, and thoroughly reliable, lending itself to the production of a wide variety of rustless irons and steels of desired nitrogen contents all at minimum cost and maximum efficiency.

While in the above illustrative embodiment of my invention, rustless iron of a desired percentage of nitrogen, is prepared from an initial charge comprising ordinary steel scrap, rustless iron scrap, chrome ore, iron oxide and nitrogen containing high carbon ferrochrome, it will be understood that good results are achieved where ferrochrome of high nitrogen content is added in desired proportions to an initial charge of ordinary low-carbon steel scrap, high-carbon ferrochrome and iron oxide or to an initial charge of rustless iron scrap and/or ordinary steel scrap, chrome ore and iron oxide.

Likewise, while in the practice of my invention, as illustratively set forth above, ferrochrome of high carbon and high nitrogen contents is employed good results are achieved where ferrochrome of a lower or higher nitrogen content is used or where the more expensive low carbon ferrochrome of high or low nitrogen content is employed. The nitrogen content ordinarily ranges between about .5% and 15%, and preferably between about .5% and 7%, with the chromium content varying between about 59% and 70%, as more particularly indicated in the co-pending application of James N. Ostrofsky referred to above. While in the illustrative embodiment of my invention the quantity of nitrogen-containing ferrochrome employed amounts to about 7.5% of the tapped metal, this quantity conveniently ranges between about 2% and 30% of the tapped metal.

As many possible embodiments may be made of my invention and as many changes may be made in the embodiment hereinbefore set forth, it is to be understood that all matter described herein is to be interpreted as illustrative, and not in a limiting sense.

I claim:

1. In the production of nitrogen-containing rustless iron and steel of fine grain structure, the art which includes, forming a ferrous metal bath containing chromium from a charge including one or more chromium-bearing metallic ingredients substantially free from nitrogen and melting in said bath an iron-chromium alloy of substantial nitrogen content, the chromium of the bath being available to take up nitrogen coming from said iron-chromium alloy of substantialy nitrogen content thereby minimizing a loss of nitrogen and assuring the production of sound metal.

2. In the production of nitrogen-containing rustless iron and steel of fine grain structure, the art which includes, melting down a charge including chromium-bearing metallic ingredients and an iron-chromium alloy having a substantial nitrogen content thereby forming a bath of ferrous metal containing chromium and a desired nitrogen content, the chromium of the forming bath being available to take up nitrogen coming from said iron-chromium alloy containing a substantial nitrogen content thereby minimizing a loss of nitrogen and assuring the production of sound metal.

3. In the production of nitrogen-containing rustless iron and steel of fine grain structure, the art which includes melting down an initial charge including rustless iron scrap and high-carbon ferrochrome of high nitrogen content to form a bath of ferrous metal containing chromium together with a substantial amount of nitrogen, the chromium of said bath being available to take up the nitrogen coming from said ferrochrome of high nitrogen content thereby minimizing a loss of nitrogen and assuring the production of sound metal.

4. In the production of nitrogen-containing rustless iron and steel of fine grain structure, the art which includes, melting down an initial charge of ingredients including rustless iron scrap and an iron-chromium alloy containing nitrogen analyzing approximately, 59 per cent to 70 per cent chromium, .5 per cent to 7 per cent nitrogen and the balance substantially iron, to form a bath of ferrous metal containing chromium together with a desired percentage of nitrogen, the chromium of said bath being available to take up nitrogen coming from said nitrogen-containing alloy thereby minimizing the loss of nitrogen and assuring the production of sound metal.

5. In the production of nitrogen-containing rustless iron and steel of fine grain structure, the art which includes melting down a charge including iron scrap, an oxide of iron and high carbon ferrochrome of high nitrogen content to form a bath of ferrous metal containing chromium together with a substantial percentage of nitrogen covered by a slag containing the oxides of iron and chromium, and reducing the oxides contained in said slag to achieve a recovery of iron and chromium by said bath and decrease the nitrogen content a proportionate amount.

6. In the production of nitrogen-containing rustless iron and steel of fine grain structure, the art which includes melting down a charge of rustless iron scrap, high carbon ferrochrome, an iron oxide and ferrochrome of high nitrogen content to form a bath of ferrous metal containing chromium together with a substantial percentage of nitrogen covered by a slag containing the oxides of iron and chromium, and reducing the oxides contained in said slag to achieve a recovery of iron and chromium by said bath and decrease the nitrogen content a proportionate amount.

7. In the production of nitrogen-containing rustless iron and steel of fine grain structure, the art which includes melting down a charge of rustless iron scrap, chrome ore and ferrochrome of high nitrogen content to form a bath of ferrous metal containing chromium and nitrogen covered by a slag containing the oxides of iron and chromium, and reducing the oxides contained in said slag whereby a recovery of iron and chromium is effected and metal of desired chromium and nitrogen contents is achieved.

8. In the production of nitrogen-containing rustless iron and steel of fine grain structure, the art which includes, melting down a charge of ingredients including iron scrap, an oxide of iron and an iron-chromium alloy analyzing approximately, 59 per cent to 70 per cent chromium, .5 per cent to 7 per cent nitrogen and the balance substantially iron, to form a bath of ferrous metal containing chromium together with a substantial percentage of nitrogen covered by a slag containing the oxides of iron and chromium, and reducing the oxides contained in said slag to achieve a recovery of iron and chromium by said bath and decrease the nitrogen content a proportionate amount.

9. In the production of nitrogen-containing rustless iron and steel of fine grain structure, the art which includes, melting down a charge of ingredients including rustless iron scrap, an iron oxide and a nitrogen-containing ferrochrome comprising about 59 per cent to 70 per cent chromium, .5 per cent to 7 per cent nitrogen and the balance substantially iron, to form a bath of ferrous metal containing chromium and nitrogen, covered by a slag containing the oxides of iron and chromium, and reducing the oxides contained in said slag to achieve a recovery of iron and chromium by said bath and decrease the nitrogen content a proportionate amount.

WILLIAM B. ARNESS.